United States Patent [19]

Gray et al.

[11] 4,279,811

[45] Jul. 21, 1981

[54] TREATMENT OF COTTONSEED MEALS FOLLOWED BY EXTRACTION WITH CERTAIN SOLVENTS TO REMOVE GOSSYPOL

[75] Inventors: Marie S. Gray, Harahan; John P. Cherry, Slidell, both of La.

[73] Assignee: The United States of America as represented by the Secretary of Agriculture, Washington, D.C.

[21] Appl. No.: 53,474

[22] Filed: Jun. 29, 1979

[51] Int. Cl.³ .............................................. A23J 1/14
[52] U.S. Cl. .................................. 260/123.5; 426/430
[58] Field of Search ...................... 260/123.5; 426/430

[56] References Cited

U.S. PATENT DOCUMENTS

| 2,485,916 | 10/1949 | Perez | 260/412.4 |
|---|---|---|---|
| 2,607,687 | 8/1952 | Rice | 426/268 X |
| 2,615,808 | 10/1952 | Rice | 426/430 X |
| 2,726,155 | 12/1955 | King et al. | 260/412.3 |
| 2,873,190 | 2/1959 | King | 426/430 |
| 2,934,432 | 4/1960 | King et al. | 426/430 |
| 2,950,198 | 8/1960 | King et al. | 260/412.4 X |
| 3,557,168 | 1/1971 | Pons et al. | 260/412.4 |
| 3,615,657 | 10/1971 | Gastrock et al. | 426/430 |
| 3,941,764 | 3/1976 | Hensarling et al. | 426/430 X |
| 3,972,861 | 8/1976 | Gardner et al. | 260/123.5 |
| 4,055,674 | 10/1977 | Yano et al. | 426/430 |
| 4,084,007 | 4/1978 | Hipp et al. | 426/430 |

OTHER PUBLICATIONS

J. Am. Oil Chemists' Soc., vol. 52, No. 3, pp. 84-87, (1975), Fore et al.
Toxic Constituents of Plant Foodstuffs, Liener, (1969), pp. 235-238.
Fed. Register, vol. 39, No. 177, Sep. 11, 1974, p. 32735.

*Primary Examiner*—Howard E. Schain
*Attorney, Agent, or Firm*—M. Howard Silverstein; David G. McConnell; Raymond C. Von Bodungen

[57] ABSTRACT

A low gossypol, high protein cottonseed product is produced by passing cottonseed meal through a certain series of steps utilizing conventional solvent extraction equipment, and culminating at a point where the cottonseed meal is rendered edible—for human consumption and animal feed—by disruption of gossypol glands and extraction of gossypol pigments.

11 Claims, No Drawings

TREATMENT OF COTTONSEED MEALS FOLLOWED BY EXTRACTION WITH CERTAIN SOLVENTS TO REMOVE GOSSYPOL

BACKGROUND OF THE INVENTION (1) Field of the Invention

This invention relates to a product and a process for producing edible low gossypol, high protein cottonseed meal.

(2) Description of the Prior Art

An abundant supply of low cost, high protein cottonseed meal remaining after the extraction of cottonseed oil provides an attractive source of edible protein. However, the use of cottonseed proteins in edible products is rare because of the presence of the toxic gossypol pigments in small pigment glands scattered throughout the cottonseed kernel. The Food and Drug Administration, HEW, permits cottonseed products used for human consumption to contain a free gossypol content not to exceed 0.045% (see Federal Register, Vol. 39, No. 177, page 32735, Sept. 11, 1974). Solvent extracted cottonseed meals often have a free gossypol content of 1-1.5% or more, and the liquid cyclone process (LCP) underflow cottonseed meals, 2.5% or more. Before the gossypol pigments can be extracted from the cottonseed meal, it is necessary to effectively rupture the pigment glands. Cottonseed meal processed by the LCP route has been dried to a moisture level of about 1.5% in order to toughen the pigment glands. Rupture of the toughened glands in the LCP underflow cottonseed meal is difficult, and thus, extraction of the gossypol pigments to a level of free gossypol acceptable for food use, is more difficult to obtain.

Over a period of a number of years there has been a marked interest in the improvement of the nutritive value of cottonseed meals. The U.S. Pat. No. 2,726,155 discloses a method for treating soybean and cottonseed meals with 20-50% water, adjusted to either an acid or alkaline pH, followed by mixing and heating to dehydrate the meal, thereby increasing the soluble nitrogen content and, consequently, the nutritive value of the meal. Although it is suggested that compounds could be added to the aqueous phase to react with gossypol and/or other components in the meals, detoxification or removal of free gossypol is not included in this method.

Pre-extraction of pigments, including gossypol, from full fat glanded cottonseed flakes with methanol containing 2.5% soap prior to the extraction of the oil by hydrocarbon is described in U.S. Pat. No. 2,485,916. The purpose of this invention is to obtain a high yield of oil of a purity comparable to that obtained from expensive refining procedures. No mention is made in this invention as to the level of free and bound gossypol pigments present in the solvent-extracted cottonseed meal.

Detoxification of defatted glanded cottonseed meal, after adjustment of the pH to between 7 and 10 with aqueous sodium hydroxide and adjustment of the moisture content to between 5 and 14%, by extraction with hot 2-propanol is described in U.S. Pat. No. 2,873,190. Free gossypol is reduced to 0.04% by a single extraction with hot 2-propanol, and 0.01% after multiple extractions. No data are given as to the levels of bound gossypol present in the cottonseed meal treated and extracted as described treatment ruptures the pigment glands, releasing gossypol and related pigments that rapidly combine with cottonseed meal constituents to form non-toxic "bound" derivatives. It is known that gossypol combines with epsilon aminolysine to lower the nutritive value of the cottonseed meal.

A process for the detoxification of defatted cottonseed meal by reacting the free or unbound gossypol pigments with organic primary amines is described in U.S. Pat. No. 2,934,432. The reaction product and the unreacted amine are removed by extraction with a nonpolar solvent. The free gossypol content in the cottonseed meal was reduced from 1.4% to 0.002% by this process.

Preparation of cottonseed meal suitable for unrestricted use in laying hen diets by a process in which the gossypol in cottonseed meats, prior to removal of oil, is chemically modified without causing detrimental changes in cottonseed protein and, thereby, producing a feed that does not cause hen eggs to become discolored on storage, is described in U.S. Pat. No. 2,873,191. Full fat cottonseed flakes are increased in moisture content to about 74% at an alkaline pH and reacted with fatty amine at 125° F. for 30 minutes with stirring, to rupture the gossypol glands, after which the heating rate is increased, causing the temperature of the material to reach a final temperature of 212° F. in approximately 30 minutes, during which the fatty amine reacts with the free gossypol. After cooling to ambient temperature the oil is extracted from the treated cottonseed meat with a liquid hydrocarbon. The resulting cottonseed meal contains less than 0.010% free gossypol.

A similar process is described in U.S. Pat. No. 2,607,687 wherein the free gossypol pigments present in defatted cottonseed meal are reacted with aniline in the presence of additional water and heat to form dianiline gossypol. Excess aniline is removed by steam distillation. The resulting animal feed is of improved color and nutritive value, with a free gossypol content of 0.015%–0.04%.

The analine process cottonseed meal was in commercial use in the 1950's marketed as degossypolized meal and later as low gossypol cottonseed meal. However, in view of the results from animal feeding tests, which showed enlarged organs, including the spleen, the product was removed from the market. The process utilizing the detoxification of gossypol by reaction of organic primary amines with free or unbound gossypol pigment has not been commercialized.

An acetone-hexane-water extraction process for the removal of free or unbound gossypol pigments from defatted cottonseed meal is described in U.S. Pat. No. 2,950,198. This process effectively removes free gossypol pigments to a level of 0.00–0.040%.

Aqueous acetone extraction of free or unbound gossypol, as well as aflatoxins (toxic mold metabolites) from cottonseed followed by hexane extraction of the cottonseed oil is described in U.S. Pat. No. 3,557,168. Free gossypol levels of the extracted cottonseed meal average 0.020%.

The two above mentioned procedures have not been commercialized because of unpleasant flavor and odor problems brought about by reactions of acetone condensation product "mesityl oxide" breakdown products of sulfur-containing amino acids to provide a "catty odor." Fore etal JAOCS 52 (3) 84–87 (1975). Also, problems with adaptation of the axeotrope process to commercial practice have lead to a lack of interest in this approach.

Production of an edible cottonseed protein concentrate from cottonseed is described in U.S. Pat. No. 3,615,657 and No. 3,972,861, wherein the cottonseed meats are dried to a moisture level of 1.5-2.5%, comminuted in a mill, and processed in a liquid cyclone with hexane to separate the cottonseed into an overflow fraction essentially free of gossypol glands with a free gossypol content of 0.03-0.04%, an underflow fraction containing gossypol glands, hulls, seed fragments, etc., and the hexane containing the extracted cottonseed oil. The liquid cyclone process produces a cottonseed protein concentrate of acceptable flavor and free gossypol content. However, 60-65% of the processed cottonseed is contained in the underflow fraction, which is extremely high in free gossypol and can be used for livestock feed only. In addition, the liquid cyclone process requires special equipment for implementation.

A method for processing glanded cottonseed for protein and oil using acetic acid-hexane mixtures to more effectively separate the oil from cottonseed is described in U.S. Pat. No. 3,941,764. Relatively few gossypol pigment glands were disrupted by the solvent-acid mixtures although the amounts of gossypol pigments in the miscella increased as the concentrations of acetic acid in hexane increased. The addition of 2% and 4% acetic acid to the hexane did not affect the solubility of the protein of the neutralized extracted cottonseed meal in 0.02 N sodium hydroxide. Addition of 10% acetic acid to hexane denatured the protein somewhat and the protein solubility was reduced to 91.3%. The cottonseed meal produced by this process, however, is high in free gossypol inasmuch as the gossypol remains in the intact pigment glands.

The extraction of cottonseed flours with solvent mixtures containing a non-polar solvent, a polar solvent, water and a food grade acid to prepare protein isolates of improved color, is described in U.S. patent application Ser. No. 943,893, filed Sept. 19, 1978. The described solvent mixture when used to extract the liquid cyclone process cottonseed flour concentrate does not appreciably reduce the free and total gossypol content of the extracted concentrate.

SUMMARY OF THE INVENTION

We have discovered a process for reducing the toxic free gossypol pigments in defatted cottonseed meals to a level acceptable for food and feed use, comprising the following steps:

a. adding to a free gossypol containing defatted, glanded cottonseed meal a humidifying agent in amounts sufficient to weaken and rupture the gossypol glands;

b. allowing the meal containing the humidifying agent to stand for a time sufficient for the humidifying agent to react with the gossypol glands;

c. extracting the product of step (b) with an organic solvent capable of removing gossypol pigments sufficient to obtain a free gossypol content below 0.045% by dry weight; and d. desolventizing the product of step (c)

The process of the instant invention overcomes the "catty odor" and flavor problems associated with the processes of the prior art that incorporate acetone in the solvent mixtures used for rupture of gossypol glands and extraction of the free gossypol pigments.

The process of the instant invention utilizes conventional practices and equipment and obviates prior art problems in implementing the azeotrope processes or the use of special equipment such as is needed in the liquid cyclone process.

The most important advantage of the invention is the very low free gossypol levels that are obtained in meals. Human food use requires levels below 0.045%, but non-ruminate feed use, especially swine, requires even lower levels. Therefore, the very low levels, as low as 0.014%, obtained allow for increased amounts in feed formulations.

DESCRIPTION OF THE PREFERRED EMBODIMENTS

Cottonseed products suitable for use as starting materials include any free gossypol containing defatted, glanded cottonseed materials such as the underflow fraction of the liquid cyclone process and defatted cottonseed meals prepared by direct solvent extraction, prepress solvent extraction and screwpress extractions. (Toxic Constituents of Plant Foodstuffs, I. E. Liener, ed. Academic Press Inc. New York & London 1969, pp 235-238). The preferred starting material is one in which the binding of free gossypol to protein and other meal constituents has been minimized.

The moisture content of the cottonseed product is adjusted to a level that effectively weakens and ruptures the gossypol glands, and thus, releases the gossypol pigments for subsequent extraction by suitable solvents. The moisture level is adjusted by the addition of a humidifying agent, such as water, or an aqueous solution of propylene glycol. Under conditions easily determined by one skilled in the art, other suitable humidifying agents include propylene glycol alone, and aqueous solutions of methanol, ethanol, propanol, butanol, and methyl ethyl ketone. When water alone is used as the humidifying agent, the final moisture level should be at least about 25% by dry weight for solvent defatted cottonseed products and at least about 30% for cottonseed meals defatted by other processes and LCP underflow. High moisture levels, 40% and above, can present problems in processing. The moisturized mass becomes sticky, clogs equipment, and filtration times are greatly increased. It is, therefore, preferred that, when using water alone as the humidifying agent, the cottonseed products be moisturized to levels of from about 25% to about 40% dry weight.

When moisturizing with an aqueous solution of propylene glycol, the solution should contain at least 15% water based on the dry weight of the cottonseed product. Water contents 35% and over cause the same processing problems described above. Therefore, the preferred aqueous solutions of propylene glycol contain from about 15% to 35% water based on dry weight of cottonseed products.

The never before reported property of propylene glycol to rupture gossypol glands permits the incorporation of lower amounts of water in the humidifying agent. The use of aqueous propylene glycol has the further advantage of requiring only 30 minutes to react with the glands at 22°-25° C. as opposed to 16 hours at 6° C. when water alone is used. Also, filtration time is reduced when aqueous propylene glycol is used.

It is preferred as a preliminary step of the inoculation to subject the starting material to screening steps. A coarse screen, sieve openings of about 0.250 mm to 2.000 mm (U.S. Standard Sieve No. 60 to 10), to remove linters, hull and seed fragments, and a fine screen, sieve openings of from 0.044 mm to 0.0210 mm (U.S. Standard Sieve No. 325 to 70), to reduce the meal to suitable particle sizes, permits more complete rupture of the gossypol glands.

It is also preferable prior to humidification to extract the cottonseed product with an organic solvent selected from the group consisting of methanol, ethanol, propanol, butanol, methyl ethyl ketone, and methylene chloride, to remove readily extractable free gossypol pigments prior to subsequent treatment in which these pigments would tend to discolor the material and, to some extent bind the epsilon aminolysine. These extractions are generally carried out at ambient temperatures and for all purposes the temperature is not one of great concern although it should be some degrees below the boiling point of the selected solvent.

It is preferable that the aqueous solvent or aqueous solvent mixture as described above be adjusted to a somewhat higher or lower pH, preferably by employing one of the following food grade organic or inorganic acids, bases, or salts: lactic acid, citric acid, malic acid, formic acid, acetic acid, propionic acid, sodium and potassium salts of the above organic acids, hydrochloric acid, orthophosphoric acid, sodium and potassium bicarbonates, monosodium phosphate, disodium phosphate, potassium phosphate, ammonium phosphate, monocalcium phosphate, sodium acid pyrophosphate, sodium triposphate, and sodium tetrametaphosphate.

It has been found that this adjustment of pH further reduced from 10% to 6% the level of water required to adequately rupture the gossypol glands and, more importantly, brought about conformational changes in the protein molecules so that, when the treated cottonseed meal subsequently was extracted with an organic solvent, the filtration was extremely rapid; and the extracted cottonseed product was considerably increased in bulk and had a fine floury texture rather than the granular texture found in the cottonseed products extracted after treatment with the previously mentioned humidifying agents, and markedly reduced the production time.

The extraction of the gossypol pigments is accomplished by extracting with an organic solvent capable of removing free gossypol, preferably with an organic solvent selected from one of the following: methanol, ethanol, butanol, methyl ethyl ketone or, methylene chloride. Methylene chloride is preferred because it is nonflammable. The material is then desolventized by suitable means.

Free and total gossypol analyses, as well as other proximate analyses, were obtained using appropriate methods from the AOCS "Official and Tentative Methods of the American Oil Chemists' Society," 1976, The Society, Chicago, Ill. Protein was calculated as nitrogen multiplied by 6.25.

The following examples are provided to illustrate the present invention and they should not be construed as limiting the invention in any manner whatever.

The examples illustrate the application of the processes described for the removal of gossypol from defatted cottonseed meal utilizing a humidification step to weaken and rupture the gossypol-containing pigment glands, followed by further rupture of the glands and extraction of the gossypol pigments with methylene chloride. The meals utilized in examples 1, 2 and 2a were derived from cottonseed meal after hexane extraction of cottonseed oil from flaked cottonseed kernels. The other three examples utilize the underflow fraction from the liquid cyclone process (LCP) and which is rich in cottonseed pigment glands. Gland walls are toughened in the LCP preliminary step to prevent rupture of the glands during comminution of the cottonseed flakes before processing in the liquid cyclone with hexane. Gossypol glands in cottonseed meals from this process are also more resistant to rupture with conventional solvents or solvent mixtures known to effectively rupture the gland walls. In addition, the gossypol pigments from the toughened glands are rich in gossypurpurin, a dark purple pigment, which may present color problems with the extracted cottonseed meal.

Cottonseed meal in Example 1 was not passed through sieves before processing. The other examples were passed through two sieves and Example 3 was passed through a third, finer sieve before processing. Table 1 gives the dry weight pre-extraction free, bound and total gossypol content, post-extraction free bound and total gossypol content, and pre-extraction and post-extraction carbohydrate content and protein content. Also included is the volume of methylene chloride used in the pre-extraction and extraction steps of the described processes.

EXAMPLE 1

Hexane Defatted Cottonseed Meal With 30% Water

Twenty five grams of hexane defatted, arid far west Texas cottonseed meal were placed in a 250 ml beaker; 7.5 ml deionized water (30%/wt of meal) were added to the meal with mixing. The beaker was covered with aluminum foil and stored at 6° C. overnight to condition the meal. The meal was mixed with 150 ml methylene chloride, dispered in a laboratory blender, transferred to a Buchner funnel fitted with Whatman #1 filter paper, filtered under vacuum and washed with an additional 850 ml methylene chloride. The meal was again dispersed with methylene chloride in the blender, filtered and washed with a total volume of 1.1 methylene chloride. This was repeated with two additional liters of methylene chloride. A fifth liter of methylene chloride was used, with the initial portion of methylene chloride being mixed with the meal in the funnel and then washed as previously described. The meal was spread on filter paper to desolventize at 22°–24° C. overnight. The methylene chloride extracted cottonseed meal free gossypol content was reduced from a level of 1.87% to 0.014%, dry weight.

EXAMPLE 2

Hexane Defatted Cottonseed Meal With 6% Water, 4% Glacial Acetic Acid, and Propylene Glycol Twenty seven grams of sieved (U.S. No. 100) hexane defatted arid far west Texas cottonseed meal and 150 ml methylene chloride were dispersed in a laboratory blender, transferred to a Buchner funnel fitted with Whatman #1 filter paper, filtered under vacuum and washed with an additional 100 ml methylene chloride. The meal was again dispersed in 150 ml methylene chloride, filtered and washed with two 100 ml portions of methylene chloride. A third extraction was similarly made with one 100 ml wash. The meal was spread on filter paper to desolventize and rehumidify at 22°–24° C. overnight, then passed through a U.S. No. 30 sieve.

Twenty five grams of pre-extracted, sieved meal and a solvent mixture consisting of 1 ml glacial acetic, 1.5 ml deionized water, and 47.5 ml propylene glycol were dispersed in a blender and allowed to react for a period of 30 min. with occasional mixing. At the end of the reaction period, 150 ml mtehylene chloride was added to the blender and the mixture dispersed, filtered and washed with 100 ml methylene chloride. The acetic acid and water were 4 and 6%, respectively, relative to the weight of cottonseed meal. Propylene glycol was added to the mixture for a total volume of 50 ml to facilitate mixing. The meal was again dispersed in 150 ml methylene chloride in the blender and allowed to react for a period of 15 min. with occasional mixing, then filtered and washed with 100 ml methylene chloride. This extraction step was repeated twice with 60 min. reaction periods in both instances. The filtrate from the final (fourth) extraction was nearly colorless. The meal was then spread on filter paper to desolventize overnight at 22°-24° C. The methylene chloride extracted cottonseed meal free gossypol content was reduced from a level of 1.08% to 0.024% dry weight.

EXAMPLE 2a

Hexane Defatted Cottonseed Meal With 6% Water, 4% Glacial Acetic Acid, And Propylene Glycol Without The Extraction Prior To Humidification Example 2a is a repeat of Example 2 except that the methylene chloride extraction prior to addition of the humidifying agent has been omitted.

Twenty five grams of sieved (U.S. No. 100) hexane defatted arid far West Texas cottonseed meal and a solvent mixture, consisting of 1 ml glacial acetic acid, 1.5 ml deionized water, and 47.5 ml propylene glycol were dispersed in a blender and allowed to react for a period of 30 minutes with occasional mixing. At the end of the reaction period, 150 ml methylene chloride was added to the blender, dispersed, allowed to react for a period of 15 minutes with occasional mixing, transferred to a Buchner funnel fitted with Whatman #1 filter paper, filtered under vacuum and washed with 100 ml methylene chloride. The meal was again dispersed in 150 ml methylene chloride in the blender and allowed to react for a period of 30 minutes with occasional mixing, then filtered and washed with 100 ml methylene chloride. This extraction was repeated once with a 30 minute reaction period and once with a 90 minute reaction period. The final (fourth) extraction had a very slight trace of color. The meal was then spread on filter paper to desolventize overnight at 22°-24° C. The methylene chloride extracted cottonseed meal free gossypol content was reduced from a level of 1.08% to 0.060% dry weight.

EXAMPLE 3

Hexane Defatted Liquid Cyclone Process Cottonseed Underflow Fraction With 25% Water Twenty seven grams sieved (U.S. No. 140) liquid cyclone process (LCP) underflow, Texas high plains cottonseed meal and 150 ml methylene chloride were dispersed in a laboratory blender, filtered under vacuum as described in Example 2, and washed with 100 ml methylene chloride. The meal was again dispersed in 150 ml methylene chloride and allowed to react for a period of 15 min. with occasional mixing, filtered and washed with 100 ml methylene chloride. This extraction was repeated once with a 15 min. reaction period and twice with 30 min. reaction period. The meal was spread on filter paper to desolventize overnight, and rehumidified at 22°-24° C., then passed through a U.S. No. 30 sieve.

Twenty five grams of the pre-extracted, sieved meal were placed in a 250 ml beaker, 6.25 ml deionized water (25%/wt of meal) were added to the meal with mixing. The beaker was covered with aluminum foil and stored at 6° C. overnight to condition. The meal and 150 ml methylene chloride were dispersed in the blender, filtered and washed with 100 methylene chloride. This extraction was repeated twice, then the meal was allowed to react with the methylene chloride for a period of 30 min. with occasional mixing in the next two extractions. In the next seven extractions, the meal was allowed to react with the methylene chloride for a period of 60 min. with occasional mixing, before filtering and washing. The meal was then spread on filter paper to desolventize at 22°-24° C. overnight. The methylene chloride extracted LCP underflow cottonseed meal free gossypol content was reduced from a level of 2.48% to 0.035%, dry weight.

EXAMPLE 4

Hexane Defatted Liquid Cyclone Process Cottonseed Underflow Fraction With 10% Water and Propylene Glycol Twenty seven grams sieved (U.S. No. 100) liquid cyclone process (LCP underflow), Texas plains cottonseed meal and 150 ml methylene chloride were dispersed in a laboratory blender, filtered under vacuum as described in Example 2, and washed with 100 ml methylene chloride. This extraction was repeated once. The meal was then allowed to react with the methylene chloride for a period of 30 min. with occasional mixing, then filtered and washed with 100 ml methylene chloride. This step was repeated three times. The meal was then spread on filter paper, and desolventized and rehumidified at 22°-24° C. overnight, then passed through a U.S. No. 30 sieve.

Twenty five grams of pre-extracted, sieved meal and a mixture of 2.5 ml deionized water and 47.5 ml propylene glycol were dispersed in the blender and allowed to react for a period of 30 min. with occasional mixing. At the end of the reaction period, 150 ml methylene chloride was added to the blender, allowed to react for a period of 15 min. with occasional mixing, filtered and washed with 100 ml methylene chloride. The water was 10% relative to the weight of the cottonseed meal, and propylene glycol was added for a total volume of 50 ml to facilitate mixing. The meal was again dispersed in the blender with 150 ml methylene chloride and allowed to react for a period of 30 min. with occasional mixing, then filtered and washed with 100 ml methylene chloride. A third extraction was made allowing a 60 min. reaction period before filtering and washing. The filtrate had a trace of color. The meal was then spread on filter paper and desolventized at 22°-24° C. overnight. The methylene chloride extracted LCP underflow cottonseed meal free gossypol content was reduced from a level of 2.71% to 0.042%, dry weight.

EXAMPLE 5

Hexane Defatted Liquid Cyclone Process Cottonseed Underflow Fraction With 6% Water, 4% Glacial Acetic Acid, and Propylene Glycol Twenty seven grams sieved (U.S. No. 100) liquid cyclone process (LCP) underflow, Texas high plains cottonseed meal and 150 ml methylene chloride were dispersed in a laboratory blender, filtered under vacuum as described in Example 2, and washed with 100 ml methylene chloride. This extraction was then repeated once. The meal was then allowed to react with the methylene chloride for a period of 30 min. with occasional mixing, then filtered and washed with 100 ml methylene chloride. This step was repeated three times. The meal was spread on filter paper and desolventized and rehumidified at 22°–24° C. overnight, then passed through a U.S. No. 30 sieve.

Twenty five grams of the pre-extracted, sieved meal and a solvent mixture consisting of 1 ml glacial acetic acid, 1.5 ml deionized water, and 47.5 ml propylene glycol were dispersed in a blender and allowed to react for a period of 30 min. with occasional mixing. At the end of the reaction period, 150 ml methylene chloride was added to the blender and the mixture dispersed, allowed to react for a period of 15 min. with occasional mixing, filtered and washed with 100 ml methylene chloride. The acetic acid and water were 4 and 6%, respectively, relative to the weight of the LCP underflow cottonseed meal. Propylene glycol was added to the mixture for a total volume of 50 ml to facilitate mixing. The meal was again dispersed in 150 ml methylene chloride in the blender, then filtered. This extraction step was repeated twice with 30 minute reaction periods in both instances, and the filtration was also followed by a 100 ml methylene wash. A fifth reaction period incorporated a 60 minute reaction period with occasional mixing, then was filtered and washed with 100 ml methylene chloride. The filtrate had a trace color. The meal was spread on filter paper to desolventize at 22°–24° C. overnight. The metylene chloride extracted LCP underflow cottonseed meal free gossypol content was reduced from 2.71% to 0.042%, dry weight.

(d) desolventizing the product of step (c).

2. The process of claim 1 wherein the defatted glanded cottonseed meal is extracted with an organic solvent capable of removing gossypol pigments prior to step (a).

3. The process of claim 1 wherein the defatted glanded cottonseed meal is passed through a coarse sieve to remove hull and seed fragments, linters, and then passed through a finer mesh screen to produce a material of smaller particle size prior to step (a).

4. The process of claim 1 wherein the humidifying agent is selected from the group consisting of aqueous propylene glycol and water in amounts such that the humidified meal contains at least 15% by weight water when aqueous propylene glycol is the humidifying agent and at 25% by weight water when water is the humidifying agent.

5. The process of claim 1 wherein the pH of the humidifying agent is modified by the addition of a food-grade organic or inorganic acid, base, or salt selected from the group consisting of
lactic acid,
citric acid,
malic acid,
formic acid,
acetic acid,
propionic acid,
a sodium or potassium salt of one of the above acids,
hydrochloric acid,
orthophosphoric acid,
sodium or potassium bicarbonate,
sodium or potassium hydroxide,
monosodium or potassium phosphate, EXAMPLE 1
GOSSYPOL, PROTEIN AND CARBOHYDRATE CONTENT (DRY WT.) OF COTTONSEED MEALS
BEFORE AND AFTER METHYLENE CHLORIDE EXTRACTION

| EX-AM-PLE | GOSSYPOL % | | | | | | PRO-TEIN (N×6.25) | CARBOHYDRATE % | | METHYLENE, L | | |
|---|---|---|---|---|---|---|---|---|---|---|---|---|
| | INITIAL EXTRACTION | | | POST EXTRACTION | | | | INITIAL EXTRAC-TION | POST EXTRAC-TION | INITIAL EXTRAC-TION | POST EXTRAC-TION | TO-TAL |
| | FREE | BOUND | TOTAL | FREE | BOUND | TOTAL | | | | | | |
| 1 | 1.87 | 0.31 | 2.18 | 0.014 | 0.130 | 0.144 | 63.63 | 32.03 | 27.56 | — | 5 | 5 |
| 2 | 1.08 | 0.08 | 1.18 | 0.024 | 0.214 | 0.233 | 67.99 | 31.09 | 24.11 | 0.85 | 1 | 1.85 |
| 2a | 1.08 | 0.08 | 1.18 | 0.060 | 0.236 | 0.296 | 69.43 | 31.09 | 22.45 | — | 1 | 1 |
| 3 | 2.48 | 1.19 | 3.67 | 0.035 | 0.233 | 0.268 | 71.89 | 38.97 | 19.89 | 1.5 | 3.5 | 5 |
| 4 | 2.71 | 0.05 | 3.16 | 0.040 | 0.229 | 0.269 | 63.49 | 37.01 | 28.84 | 1.25 | 0.75 | 2 |
| 5 | 2.71 | 0.05 | 3.16 | 0.042 | 0.253 | 0.295 | 63.45 | 37.01 | 28.93 | 1.25 | 1.15 | 2.35 |

We claim:

1. A process for reducing total gossypol and in particular toxic free gossypol pigments in defatted cottonseed meal to a level acceptable for food and feed uses comprising the steps of:
   (a) adding to a free gossypol containing defatted glanded cottonseed meal a humidifying agent selected from the group consisting of water, propylene glycol, and aqueous solutions of propylene glycol, methanol, ethanol, propanol, butanol, and methyl ethyl ketone in amounts sufficient to weaken and rupture gossypol glands;
   (b) allowing the cottonseed meal containing the humidifying agent to stand for a time sufficient for said humidifying agent to weaken and rupture said gossypol glands;
   (c) extracting the product of step (b) with methylene chloride sufficiently to obtain a free gossypol content of below about 0.045% by dry weight of meal; and disodium or dipotassium phosphate,
ammonium phosphate,
monocalcium phosphate,
sodium acid pyrophosphate,
sodium triphosphate, and
sodium tetrametaphosphate.

6. The process of claim 2 wherein the organic solvent is methylene chloride.

7. The process of claim 3 wherein the coarse mesh screen is one having standard sieve openings of about from 0.250 mm (U.S. Sieve No. 60) to 2.000 mm (U.S. Standard Sieve No. 10), and wherein the fine mesh screen is one having standard sieve openings of about from 0.044 mm (U.S. Standard Sieve No. 325) to 0.210 mm (U.S. Standard Sieve No. 70).

8. The process of claim 3 wherein the sieved defatted, glanded cottonseed meal is extracted with methylene chloride prior to step (a).

9. The process of claim 4 wherein the amount of water contained in meal humidified with aqueous propylene glycol is from about 15% to 35% by weight and the amount of water contained in the meal humidified by water is from about 25% to 40% by weight.

10. The process of claim 5 wherein the organic acid is acetic acid.

11. The process of claim 4 wherein no more than 2% by weight of meal of glacial acetic acid is added to the humidifying agent.

* * * * *